United States Patent [19]

McKechnie et al.

[11] 4,160,903
[45] Jul. 10, 1979

[54] ELECTRO-OPTICAL RADIO SYSTEM

[75] Inventors: John C. McKechnie; Herbert Berke, both of Maitland, Fla.

[73] Assignee: The United States of America as represented by the Secretary of the Navy, Washington, D.C.

[21] Appl. No.: 840,201

[22] Filed: Oct. 7, 1977

[51] Int. Cl.² .............................................. H04B 9/00
[52] U.S. Cl. ..................................................... 250/199
[58] Field of Search ......................................... 250/199

[56] References Cited

U.S. PATENT DOCUMENTS

| 3,229,098 | 1/1966 | Giannini | 250/199 |
|---|---|---|---|
| 3,433,959 | 3/1969 | Atwood | 250/199 |
| 3,528,011 | 9/1970 | Anderson | 250/199 |
| 4,028,977 | 6/1977 | Ryeczek | 250/199 |
| 4,064,434 | 12/1977 | Waksberg | 250/199 |

Primary Examiner—Howard W. Britton
Attorney, Agent, or Firm—Richard S. Sciascia; Robert W. Adams

[57] ABSTRACT

A radio communications system is disclosed as incorporating a high frequency electrical signal generator employed for energizing a light emitting diode, the latter of which projects its light toward a vibratable, flexible, light-reflecting diaphragm for reflection thereof thereby. The light reflected from said diaphragm is received by a photodiode which, in turn, energizes a radio transmitter with electrical energy that is proportional thereto for the effective broadcast thereof toward a, perhaps, remotely disposed compatible radio receiver and/or other utilization apparatus. The aforesaid diaphragm vibrates in response to an acoustical communication signal applied thereto, thereby causing it to effectively vibrate and modulate the light reflected thereby therewith and, hence, the broadcast thereof toward said remotely disposed radio receiver is ultimately effected.

30 Claims, 2 Drawing Figures

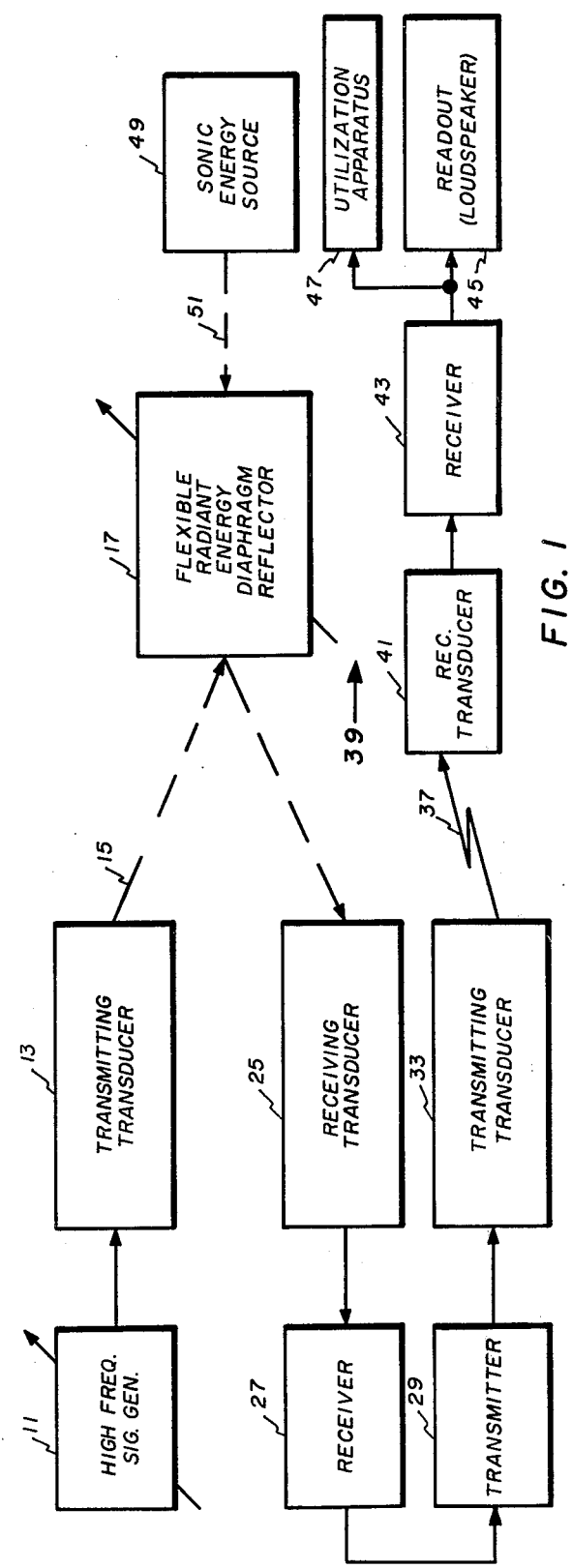
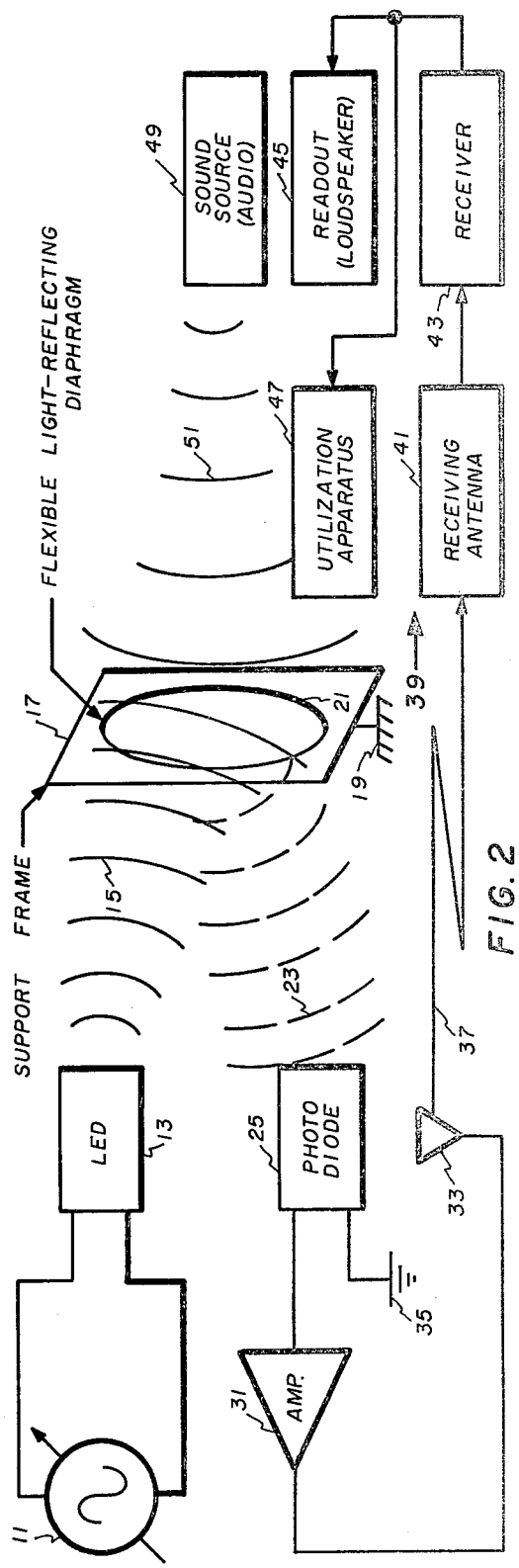

ELECTRO-OPTICAL RADIO SYSTEM

FIELD OF THE INVENTION

The present invention, in general, relates to communication systems and, in particular, is a new and unique radio transmitting-receiving system which incorporates an unusual amplitude modulation component for information insertion purpose. In even greater particularity, it comprises a voice or other audio type modulation system in which acoustical energy is employed to modulate light in proportion thereto that may subsequently be converted to radio frequency energy which is capable of being broadcast to and received by a radio receiver remotely located with respect thereto.

DESCRIPTION OF THE PRIOR ART

Heretofore, numberous radio transmitting systems have been used in conjunction with even larger numbers of radio receivers disposed at various and sundry locations, either remote or close by. For example, the conventional radio transmitter makes use of complex electronic circuitry to modulate carrier frequency signals with voice and other audio frequency signals before they are broadcast throughout a given ambient environmental medium, ordinarily consisting of the earth's atmosphere or space, as desired. For many practical purposes such prior art radio systems have performed well indeed; on the other hand, for some purposes, they seem to leave something to be desired, in that they are complex, delicate, require frequent alignment and tuning, and are usually quite expensive to manufacture, maintain, and operate. Accordingly, it would appear that there is also a need for the unusual radio system constituting this invention, with the need therefor becoming more readily apparent as it is discussed in greater detail below.

SUMMARY OF THE INVENTION

Primarily, the subject invention is a radio system which includes a high frequency electric signal generator that energizes a light that, in turn, shines its light on the surface of a flexible, light-reflective diaphragm. The light reflected from said diaphragm is then received by a photodiode wwhich produces an electrical signal at the output thereof that is proportional thereto. Said electrical signal is then amplified—and perhaps otherwise processed in such manner as to effect the optimization thereof for any given operational purpose—and broadcast as a radio signal to some remote or nearby radio receiver or other utilization apparatus. The impact of sonic energy—say, for instance, the human voice—on one surface of the aforesaid diaphragm causes it to vibrate in correspondence therewith and, thus, modulate the light reflected therefrom. Conversion of said reflected modulated light back to an electrical signal comparable thereto permits the effective broadcast thereof as a data or information carrying radio signal susceptible to being received and detected back to an intelligible audio signal by a conventional or other radio receiver or device. Because the type of material, size, flexibility, thickness, geometrical configuration, reflectance, and the like, of the aforesaid diaphragm may be varied as desired, the fidelity, bandwidth, frequency response, etc., thereof may likewise be varied merely by structurally customizing it for optimum operation during any given operational circumstances. Of course, so doing would be well within the purview of the artisan having the benefit of the teachings presented herein.

Therefore, an important object of this invention is to provide an improved radio system.

Another object of this invention is to provide an improved method and means for modulating radiant energy, such as light or the like.

Still another object of this invention is to provide a high or otherwise fidelity customized radio or radiant energy transmitter system.

A further object of this invention is to provide a new and unique controllable bandwidth radio transmitter.

Another object of this invention is to provide a radio transmitter that may be intelligence or data modulated by any appropriate pressure wave or plurality thereof.

Another object of this invention is to provide a relatively simple but highly useful radio transmitter system that is comparably easy and economical to construct, maintain, align, and use.

Other objects and many of the attendant advantages of this invention will be readily appreciated as the same becomes better understood by reference to the following detailed description, when considered in connection with the accompanying drawing, wherein:

BRIEF DESCRIPTION OF THE DRAWING

FIG. 1 is a generalized block diagram which depicts the subject invention;

FIG. 2 is a rather specific disclosure—in combined block diagram and schematic structural form—of the system of FIG. 1.

DESCRIPTION OF THE PREFERRED EMBODIMENT

Referring now to both FIGS. 1 and 2, wherein like parts are referenced by like reference numerals, there is disclosed an adjustable high frequency, alternating current, signal generator 11 which produces an electrical signal having the frequency—say, for instance, ten megacycles per second—desired for any given operational system. The output of high frequency signal generator 11 is connected to the input of a suitable transmitting transducer 13 which converts the aforesaid electrical signal into a radiant energy signal that is proportional thereto. Although, as implied by FIG. 1, the type of transmitting transducer employed therein is without limitation, as indicated in FIG. 2, such transmitting transducer 13 may be, in fact, a light emitting diode (LED). As a matter of fact, for the purpose of keeping this preferred embodiment disclosure as simple as possible, the modulated radiant energy and the various components associated therewith will be considered to be light and light compatible apparatus, respectively. Hence, in the preferred embodiment being discussed, light 15 is broadcast along a predetermined optical axis toward a flexible radiant energy diaphragm reflector 17, which, as previously mentioned, may be custom designed for any given operational circumstances. Of course, said diaphragm 17 may be mounted in any suitable conventional mounting, framing, or support means 19 (not shown in structural detail) without violating the spirit or scope of the invention. A light reflector portion 21 may either be an integral part of diaphragm 17 or, for instance, it may be any wavelength responsive patch bonded or otherwise conventionally attached thereto. And, of course, the geometrical configuration thereof may be varied as desired, depending on operational circumstance and perhaps the ambient environmental medium within which it is being used. In any event, diaphragm 17 and/or patch 21 must be flexible and of such reflection characteristics as will cause it to reflect light 15 upon impact thereby thereon and, consequently, relfect it back as light 23 to a suitable receiving transducer 25, such as, in this particular case, a photodiode 25.

As best seen in FIG. 1, the output of receiving transducer 25 is connected to any predetermined signal processing receiver 27, where is is or may be converted to a more useful level and/or shape thereby before being supplied via electrical conductor means to a transmitter 29, which, in turn, may again power and/or otherwise customize it prior to the broadcast thereof. However, in the event an exceedingly simple embodiment of the invention is warranted, a power amplifier 31 may be used in lieu of the aforementioned receiver 27 and transmitter 29, as best seen in FIG. 2. Obviously, it would be well within the purview of one skilled in the art having the benefit of the teaching present herewith to decide the degree of sophisticated signal processing necessitated by any given operational circumstances and design receiver 27, transmitter 29, or amplifier 31 accordingly.

The output of transmitter 29 is connected to the input of a transmitting transducer 33 (see FIG. 1), and the output of amplifier 31 is connected to a transmitting antenna 33 (see FIG. 2), a preferred species of transducer 33 in this instance.

Because the more specific embodiment of the invention shown in FIG. 2 incorporates a photodiode 25 having two electrical leads, one thereof is connected to a ground 35 and the other thereof is connected to the input of the aforesaid power amplifier 31.

Transducer or antenna 33, as the case may be, broadcasts radio frequency energy 37 to any radio receiving apparatus 39. In the generalized system of FIG. 1, radio frequency energy 37 is received by receiving transducer 41, which is shown more specifically as receiving antenna 41 in the device of FIG. 2; hence, they both have the same reference numeral. The outputs thereof are then connected to the inputs of receivers 43, the outputs of which may be optionally connected to the inputs of any readout 45—such as, for example, a loud speaker——and/or any other utilization apparatus 47 compatible therewith. respectively.

A sonic energy source 49—such as, for example, the human voice, a programmed or programmable data signaling device, or any other pressure wave source—braodcasts sonic or acoustical energy 51 of any frequency toward one side of the aforesaid flexible light-reflecting diaphragm 17. Although shown as being impacting on the side thereof that is opposite the light-reflecting side, acoustical energy 51 may approach diaphragm 17 from the other side thereof, too, since so doing may, under certain circumstances, make the subject invention more versatile.

At this time, it may be worthy of note that the invention will work—at least to some practical extent—within several environmental mediums; however, it is intended to be primarily operated within the earth's atmosphere. On the other hand, by incorporating suitable design modifications, it could be made to operate effectively within such mediums as water, space, vacuum, or other liquid, gaseous, or combination fluid mediums.

Moreover, it also may be noteworthy that, with the possible exception of flexible light-reflecting diaphragm 17, all of the elements making up the subject invention are well known, conventional, and commercially available; therefore, it is to be understood that it is their new and unique interconnections and interactions, especially in combination with diaphragm 17, that makes the intant invention distinguish over all of the prior art mentioned heretofore or known. Of course, diaphragm 17 may be made of any appropriate conventional materials, too, as previously suggested, and thus, it may be considered as being conventional, as well, for most practical purposes. For instance, it may be made of resilient rubber, with reflector face 21 bonded thereto or painted thereon being made of a light-reflecting chromium paint or the like.

Although relatively simple of structure, the invention produces many unique, unobvious synergistic results; accordingly, its value and usefulness exceeds appearances, thereby causing it to constitute some advance in the radio communication art and perhaps in some other arts, as well.

MODE OF OPERATION

The operation of the invention will now be discussed briefly in conjunction with both figures of the drawing and especially in conjunction with the system shown in FIG. 2 thereof.

Very simply, high frequency signal generator 11 produces an electrical signal which energizes light emitting diode 13 at the same frequency. Accordingly, light emitting diode 13 broadcasts a given high frequency light 15 towards the reflective surface of diaphragm 17. If diaphragm 17 is not being bombarded by sonic energy from energy source 47, it is in its quiescent state, and light 23 reflected therefrom has substantially the same frequency as light 15. But if sonic energy 51 is impacting on diaphragm 17, it vibrates, and then, for all practical purposes, reflected light 23 becomes amplitude modulated thereby, so that it, in effect, becomes a high frequency light carrier wave with an audio modulation thereon. Photodiode 25 then receives modulated light 23 and transduces it into an electrical signal proportional thereto, and that electrical signal is, in turn, amplified by power amplifier 31 before being broadcast by antenna 33.

As just mentioned, for all practical purposes light 15 is amplitude modulated by vibrating diaphragm 17; however, a very, very small amount of frequency modulation thereof occurs, too. But, because the speed of sound is so small compared to the speed of light, the amount of frequency modulation is, likewise, so small as to be negligible, and thus, the phase shift of light 23 is so small as to be inconsequential for most auido transmission purposes. Nevertheless, it is there in the event circumstances warrant the processing and use thereof for some predetermined purpose; but, again, and for purposes of emphasis, the frequency modulation aspect of the invention is so small as to be almost immeasurable. Hence, even though it does not appear to be useful at this time, it causes no adverse effects to occur, as far as audio transmissions are concerned.

Of course, any suitable radio receiving system—such as, for example, that which is effected by receiving transducer or antenna 41 and receiver 43—may be used to receive and detect the carrier wave 37 containing the audio intelligence or data originally eminating from sound source 49. Also for such purpose, receiver 43 is combined therein with readout 45—such as, a loud speaker, or the like—so that an audio readout will occur that may be heard and understood by human beings, Moreover, as may readily be seen from both figures of the drawing, any compatible utilization apparatus may be actuated by the received audio signal, preferably after suitable processing for the sake of efficiency by receiver 43.

As previously indicated, the preferred embodiment of the subject invention is more simply disclosed in the block and schematic diagram of FIG. 2; however, as evidenced by the more generalized disclosure of FIG. 1, numerous other components may be respectively substituted therefor, if so desired or if so doing would optimize the invention for any given purpose. Therefore, it should be understood that the subject invention is not to be limited to that indicated as being the preferred embodiment.

Obviously, many modifications and variations of the present invention are possible in the light of the above teachings. It is therefore to be understood that within the scope of the appended claims the invention may be practiced otherwise than as specifically described.

What is claimed is:

1. A communication system, comprising in combination:

means for generating a first electrical signal having a predetermined frequency greater than zero Hertz;

means connected to the output of said first electrical signal generating means for transducing the first electrical signal generated thereby into a first radiant energy signal having a frequency identical thereto and for effecting the broadcast thereof along a first path;

means spatially disposed along said first path from said transducing means for receiving said first radiant energy signal therefrom and for effecting the timely reflection thereof as a second radiant energy signal along a second path that is different from the aforesaid first path, said first radiant energy signal receiving and reflection effecting means being sufficiently flexible to be vibration responsive to a predetermined third radiant energy signal received from along a third path;

means spatially disposed along said second path for receiving said second radiant energy signal after the reflection thereof by the aforesaid receiving and reflection effecting means and for transducing it into a second electrical signal proportional thereto; and means connected to the output of said second radiant energy signal transducing means for effectively broadcasting a fourth signal that is proportional to said second electrical signal throughout a predetermined ambient environmental medium.

2. The device of claim 1, wherein said means for generating a first electrical signal having a predetermined frequency comprises an alternating current electrical generator.

3. The device of claim 1, wherein said means connected to the output of said first electrical signal generating means for transducing the first electrical signal generating thereby into a first radiant energy signal having a frequency identical thereto and for effecting the broadcast thereof along a first path comprises a transmitting transducer.

4. The device of claim 1, wherein said means connected to the output of said first electrical signal generating means for transducing the first electrical signal generated thereby into a first radiant energy signal having a frequency identical thereto and for effecting the broadcast thereof along a first path comprises a light emitting diode.

5. The device of claim 1, wherein said means spatially disposed along said first path from said transducing means for receiving said first radiant energy signal therefrom and for effecting the timely reflection thereof as a second radiant energy signal along a second path that is different from the aforesaid first path, said first radiant energy signal receiving and reflection effecting means being sufficiently flexible to be vibration responsive to a predetermined third radiant energy signal received from along a third path, comprises a flexible radiant energy reflector.

6. The device of claim 1, wherein said means spatially disposed along said first path from said transducing means for receiving said first radiant energy signal therefrom and for effecting the timely reflection thereof as a second radiant energy signal along a second path that is different from the aforesaid first path, said first radiant energy signal receiving and reflection effecting means being sufficiently flexible to be vibration responsive to a predetermined third radiant energy signal received from along a third path, comprises a flexible light reflecting diaphragm.

7. The device of claim 1, wherein said means spatially disposed along said first path from said transducing means for receiving said first radiant energy signal therefrom and for effecting the timely reflection thereof as a second radiant energy signal along a second path that is different from the aforesaid first path, said first radiant energy signal receiving and reflection effecting means being sufficient flexible to be vibration responsive to a predetermined third radiant energy signal received from along a third path, comprises:

a flexible diaphragm; and a light reflecting surface of predetermined geometrical configuration and radiant energy reflection characteristics such as will cause it to reflect predetermined wavelengths of light effectively bonded to said flexible diaphragm.

8. The device of claim 1, wherein said means spatially disposed along said second path for receiving said second radiant energy signal after the reflection thereof by the aforesaid receiving and reflection effecting means and for transducing it into a second electrical signal proportional thereto comprises a receiving transducer.

9. The device of claim 1, wherein said means spatially disposed along said second path for receiving said second radiant energy signal after the reflection thereof by the aforesaid receiving and reflection effecting means and for transducing it into a second electrical signal proportional thereto comprises a photodiode.

10. The device of claim 1, wherein said means connected to the output of said second radiant energy signal transducing means for effectively broadcasting a fourth signal that is proportional to said second electrical signal throughout a predetermined ambient environmental medium comprises:

an amplifier; and a radio antenna connected to the output of said amplifier.

11. The device of claim 1, wherein said means connected to the output of said second radiant energy signal transducing means for effectively broadcasting a fourth signal that is proportional to said second electrical signal throughout a predetermined ambient environmental medium comprises:

a receiver;
a transmitter connected to the output of said receiver; and
a transmitting transducer connected to the output of said transmitter.

12. The device of claim 11, wherein:
said transmitter comprises a radio transmitter; and
said transmitting transducer comprises a radio antenna.

13. The device of claim 1, further characterized by means for receiving and utilizing the aforesaid fourth signal.

14. The device of claim 13, wherein said means for receiving and utilizing said fourth signal comprises:
a receiving antenna;
a receiver connected to the output of said receiving antenna; and
a utilization apparatus connected to the output of said receiver.

15. The device of claim 14, wherein:
said receiving antenna comprises a radio antenna; and
said receiver comprises a radio receiver.

16. The device of claim 1, further characterized by means, spatially disposed from said means connected to the output of said second radiant energy signal transducing means for effectively broadcasting a fourth signal that is proportional to said second electrical signal throughout a predetermined ambient environmental medium, for receiving and reading out the aforesaid fourth signal.

17. The device of claim 16, wherein said means for receiving and reading out the aforesaid fourth signal comprisies:
a receiving antenna;
a receiver connected to the output of said receiving antenna; and
a readout connected to the output of said receiver.

18. The device of claim 17, wherein:
said receiving antenna comprises a radio antenna; and
said receiver comprises a radio receiver.

19. The device of claim 16, wherein said means for receiving and reading out said fourth signal comprises:
a receiving antenna;
a receiver connected to the output of said receiving antenna; and
a loud speaker connected to the output of said receiver.

20. The device of claim 19, wherein:
said receiving antenna comprises a radio antenna; and
said receiver comprises a radio receiver.

21. An electro-optical radio system, comprising in combination:
a high frequency electrical signal generator;
a light-emitting diode connected to the output of said high frequency electrical signal generator, said light-emitting diode disposed in such manner as to shine the light emitted therefrom along a first optical path;
a flexible light-reflecting diaphragm spatially located from said light-emitting diode along said first optical path and in such manner as to reflect at leat a portion of the light emitted therefrom along a second optical path;
a photodiode spatially disposed from said flexible light-reflecting diaphragm along said second optical path for response to at least a portion of the light reflected thereby;
means connected to the output of said photodiode for processing the electrical signal produced thereby to a more useful value; and
a transducer connected to the output of the aforesaid electrical signal processing means.

22. The device of claim 21, wherein said means connected to the output of said photodiode for processing the electrical signal produced thereby to a more useful level comprises a power amplifier.

23. The device of claim 21, wherein said means connected to the output of said photodiode for processing the electrical signal produced thereby to a more useful level comprises:
a radio receiver; and
a radio transmitter connected to the output of said radio receiver.

24. The device of claim 21, wherein said transmitting transducer connected to the output of the aforesaid electrical signal processing means comprises a radio antenna.

25. The device of claim 21, wherein, said light-emitting diode is a diode that emits visible white light.

26. The device of claim 21, wherein said light-emitting diode is a diode that emits light within a predetermined spectrum other than the white light spectrum.

27. The device of claim 21, wherein said photodiode spatially disposed from said flexible light-reflecting diaphragm along said second optical path for response to at least a portion of the light reflected thereby, comprises a white light response photodiode.

28. The device of claim 21, wherein said photodiode spatially disposed from said flexible light-reflecting diaphragm along said second optical path for response to at least a portion of the light reflected thereby, comprises a photodiode adapted for response to light having a predetermined wavelength.

29. An electro-optical radio system, comprising in combination:
a high frequency electrical signal generator;
a light-emitting diode connected to the output of said high frequency electrical signal generator, said light-emitting diode disposed in such manner as to shine the light emitted therefrom along a first optical path;
a flexible light-reflecting diaphragm spatially located from said light-emitting diode along said first optical path and in such manner as to reflect at least a portion of the light emitted therefrom along a second optical path;
a photodiode spatially disposed from said flexible light-reflecting diaphragm along said second optical path for response to at least a portion of the light reflected thereby;
means connected to the output of said photodiode for processing the electrical signal produced thereby to a more useful value;
a transmitting radio antenna connected to the output of the aforesaid electrical signal processing means;
a receiving radio antenna spatially disposed from said transmitting radio antenna;
a radio receiver connected to the output of said radio receiving antenna; and
an electro-acoustical transducer connected to the output of said radio receiver.

30. The device of claim 29, further characterized by a predetermined utilization apparatus effectively connected to the output of the aforesaid radio receiver.

* * * * *